(12) United States Patent
Nakayama et al.

(10) Patent No.: US 7,004,476 B2
(45) Date of Patent: Feb. 28, 2006

(54) COMBUSTION GAS SEAL FOR INJECTOR

(75) Inventors: Junichi Nakayama, Fujisawa (JP); Masahiro Kawabata, Nihonmatsu (JP)

(73) Assignee: NOK Corporation, Tokyo (JP)

( * ) Notice: Subject to any disclaimer, the term of this patent is extended or adjusted under 35 U.S.C. 154(b) by 33 days.

(21) Appl. No.: 10/398,659

(22) PCT Filed: Oct. 12, 2001

(86) PCT No.: PCT/JP01/08999

§ 371 (c)(1),
(2), (4) Date: May 28, 2003

(87) PCT Pub. No.: WO02/31354

PCT Pub. Date: Apr. 18, 2002

(65) Prior Publication Data
US 2003/0178784 A1    Sep. 25, 2003

(30) Foreign Application Priority Data

Oct. 13, 2000   (JP)   ................. 2000-313891

(51) Int. Cl.
*F02F 11/00*   (2006.01)
(52) U.S. Cl. ............ 277/591; 277/641; 277/644; 123/470; 285/95
(58) Field of Classification Search ........... 277/590, 277/591, 641, 644, 531, 532; 123/470; 285/95, 285/113
See application file for complete search history.

(56) References Cited

U.S. PATENT DOCUMENTS

| | | | | |
|---|---|---|---|---|
| 3,046,026 A | * | 7/1962 | Burrows | 277/643 |
| 3,214,182 A | * | 10/1965 | Herbruggen | 277/465 |
| 3,244,377 A | | 4/1966 | Roosa | 239/533 |
| 3,334,617 A | * | 8/1967 | Palkowsky | 123/470 |
| 3,567,258 A | * | 3/1971 | Scaramucci | 285/334.4 |
| 3,690,682 A | * | 9/1972 | Ferrill | 277/641 |
| 4,519,371 A | * | 5/1985 | Nagase et al. | 123/470 |
| 5,044,340 A | * | 9/1991 | Robnett | 123/470 |
| 5,263,647 A | * | 11/1993 | Cerny et al. | 239/585.1 |
| 5,524,904 A | * | 6/1996 | Willi et al. | 277/552 |
| 5,752,487 A | * | 5/1998 | Harrell et al. | 123/470 |
| 5,927,726 A | * | 7/1999 | Achenbach et al. | 277/609 |
| 6,186,123 B1 | * | 2/2001 | Maier et al. | 123/470 |
| 6,494,465 B1 | * | 12/2002 | Bucknell | 277/641 |

FOREIGN PATENT DOCUMENTS

JP   54-37719   3/1979

(Continued)

*Primary Examiner*—Alison K. Pickard
(74) *Attorney, Agent, or Firm*—Jacobson Holman PLLC

(57) ABSTRACT

A combustion gas seal for injectors having the function to prevent the leak of a combustion gas when the injector is mounted on a cylinder head of an engine, wherein the seal is made of a resin and the entire surface of the combustion gas side end of the seal is exposed to the pressure of the combustion gas. The seal exhibits improved sealing performance together with improved soundproofing effect.

4 Claims, 10 Drawing Sheets

FOREIGN PATENT DOCUMENTS

| | | |
|---|---|---|
| JP | 58-60088 | 4/1983 |
| JP | 59-45276 | 3/1984 |
| JP | 60-47957 | 4/1985 |
| JP | 63-63578 | 4/1988 |
| JP | 2-114767 | 9/1990 |
| JP | 5-42671 | 6/1993 |
| JP | 6-40365 | 5/1994 |
| JP | 6-51627 | 7/1994 |
| JP | 2000-9000 | 1/2000 |
| WO | WO02/12717 | 2/2002 |

* cited by examiner

COMBUSTION GAS SEAL FOR INJECTOR

This is a nationalization of PCT/JP01/08999, filed Oct. 12, 2001 and published in Japanese.

TECHNICAL FIELD

The present invention relates to a combustion gas seal for injectors, intended for prevention of leakage of a combustion gas in a state, in which an injector is mounted on a cylinder head of an engine.

BACKGROUND ART

FIG. 18 is a schematic configuration showing a state, in which an injector is mounted on a cylinder head of an engine.

In the case where an injector 50 is mounted on a cylinder head 60 of an engine, it is necessary to prevent leakage of a combustion gas from a neighborhood of a mount of the injector 50.

Thus, washer-shaped seals 100, 101 are conventionally provided in two locations on the mount of the injector 50 as shown in FIG. 18 to prevent leakage of a combustion gas.

The seals 100, 101 are formed from metal such as copper, or the like, and sealing is achieved by a clamping force Q (see FIG. 19), which is obtained by a fastening force when the injector 50 is mounted on the cylinder head 60 of an engine. In addition, for example, as shown in FIG. 18, the fastening force can be obtained by screwing an external thread portion provided on the injector 50 into an internal thread portion provided on the cylinder head 60.

With the above conventional art, however, sealing of the metallic washer-shaped seals 100, 101 is achieved by utilization of the clamping force, so that vibrations caused by an engine or the like are transmitted to the seals 100, 101 to produce a large sound at the sealed portion, which is responsible for noise.

Also, load based on vibrations and heat causes reduction in the clamping force whereby a sealing performance is degraded with the passage of time.

An object of the invention is to provide a combustion gas seal for injectors, which improves a sound insulation effect and a sealing performance.

DISCLOSURE OF THE INVENTION

To attain the above object, the invention provides a combustion gas seal for injectors, formed from a resin and attached in a attachment groove provided in an injector, which is to be mounted on a cylinder head of an engine, to seal an annular gap between the cylinder head and the injector, characterized in that an inner diameter prior to compressive deformation is set to be smaller than an outer diameter of the attachment groove and an outer diameter prior to compressive deformation is set to be larger than an inner diameter of a seal abutment of the cylinder head, and that an entire end surface on a combustion gas side is arranged to be exposed to combustion gas.

With such constitution, inner and outer diameter sides of the combustion gas seal for injectors are brought into close contact with an injector and a cylinder head, respectively, without any gap therebetween, and an entire end surface thereof on a combustion gas side is exposed to the combustion gas, so that the combustion gas seal for injectors is caused by pressure applied by the combustion gas to extend toward inner and outer diameter sides, and surface pressures are further increased. Also, since the seal is formed from a resin, it is possible to prevent generation of noise.

A combustion gas is believed to be at about 180° C., and so the seal is preferably formed from a resin material having a thermal resistance of at least 200° C.

Thereby, while that portion, on which an injector is mounted, is put in a comparatively high temperature state, it is possible to reduce deterioration even in use at such high temperature.

Preferably, a groove is provided on an entire periphery of the end surface on the combustion gas side to be opened to the combustion gas side.

Thereby, pressures of the combustion gas apply on wall surfaces of the groove, and therefore adhesion to the injector and the cylinder head is further enhanced.

Preferably, a tapered surface is provided on an entire periphery of an inner-peripheral side end edge of the end surface on the combustion gas side.

Thereby, pressures of the combustion gas apply on the tapered surfaces whereby adhesion to an outer peripheral side (cylinder head) is further enhanced.

Preferably, a plurality of tapered surfaces disposed at circumferential intervals is provided on an inner peripheral side end edge of the end surface on the combustion gas side.

Thereby, pressures of the combustion gas apply on the tapered surfaces whereby adhesion to an outer peripheral side (cylinder head) is further enhanced. Also, those portions, on which the tapered surfaces are not provided, provide a high rigidity whereby abnormal deformation is prevented.

Preferably, inner peripheral surfaces of those portions, on which the tapered surfaces are not provided, abut against a groove bottom surface of the attachment groove.

Thereby, the inner peripheral surfaces of those portions, on which the tapered surfaces are not provided, function as stoppers whereby abnormal deformation is surely prevented.

BEST MODE FOR CARRYING OUT THE INVENTION

Figure 1:
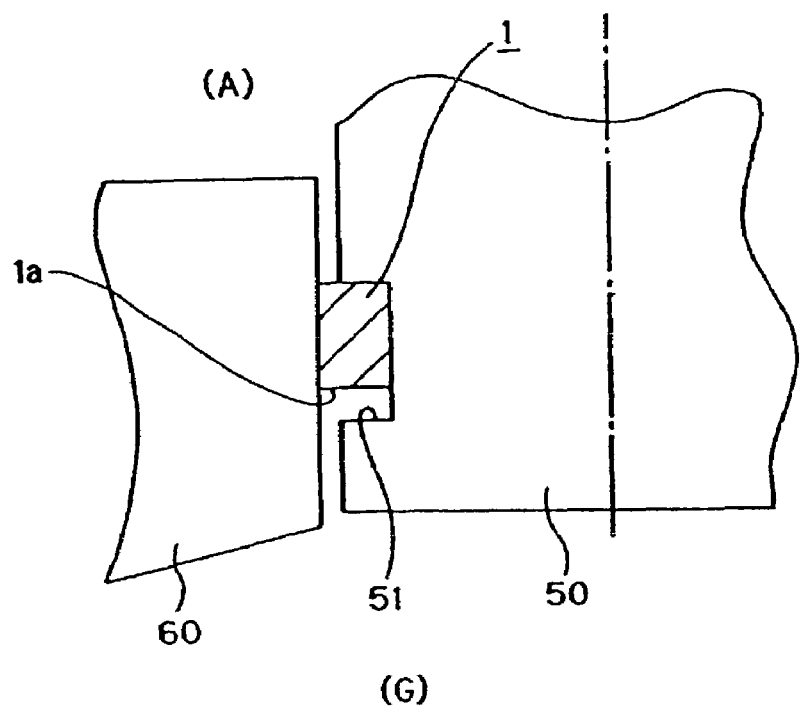
FIG. 1 is a schematic, cross sectional view showing a state, in which a combustion gas seal for injectors, according to a first embodiment of the invention, is attached.

Preferred embodiments of the invention will be exemplarily explained below in detail referring to the drawings. However, a scope of the invention is not to be limited only to dimensions, materials, configurations, relative arrangement, and the like of constituent parts described in the embodiments unless specifically described.

(First Embodiment)

A combustion gas seal for injectors, according to a first embodiment of the invention, will be explained referring to FIGS. 1 to 5.

Figure 2:
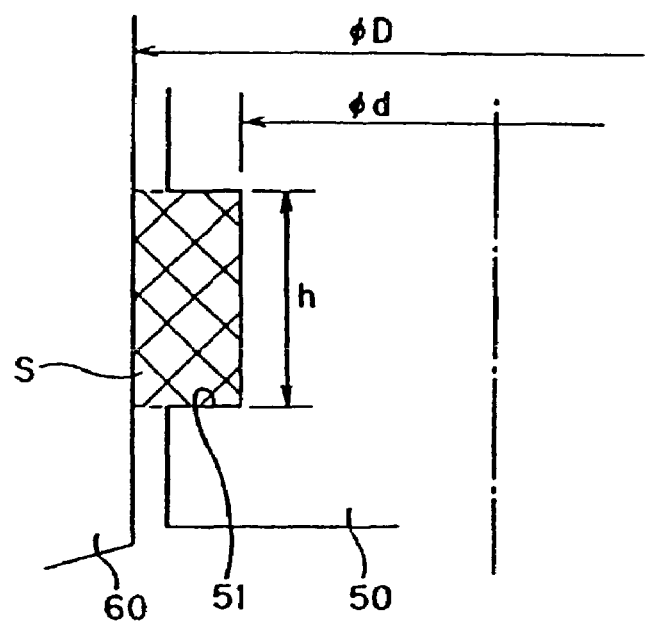
FIG. 2 is a schematic, cross sectional view showing a mating structure, on which the combustion gas seal for injectors, according to the embodiment of the invention, is mounted.
Figure 3:
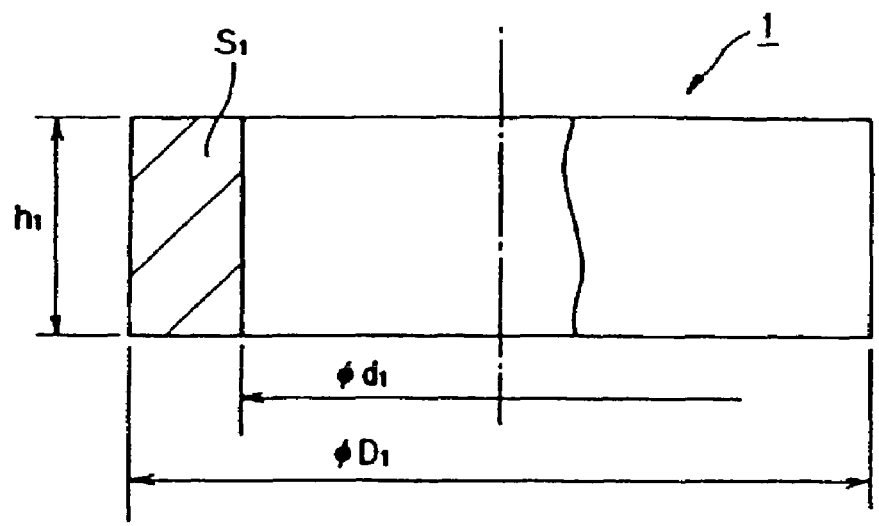
FIG. 3 is a cross sectional view showing the combustion gas seal for injectors, according to the first embodiment of the invention, with a part thereof broken away.
Figure 4:
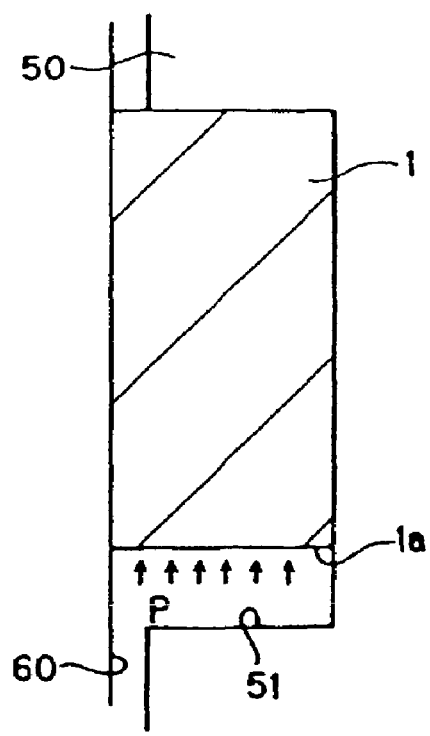
FIG. 4 is a partially enlarged view of FIG. 1.
Figure 5:
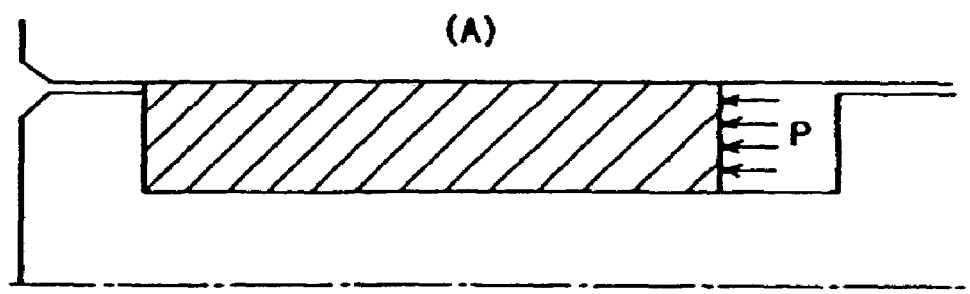
FIG. 5 is a view illustrating a surface-pressure distribution.
Figure 5:
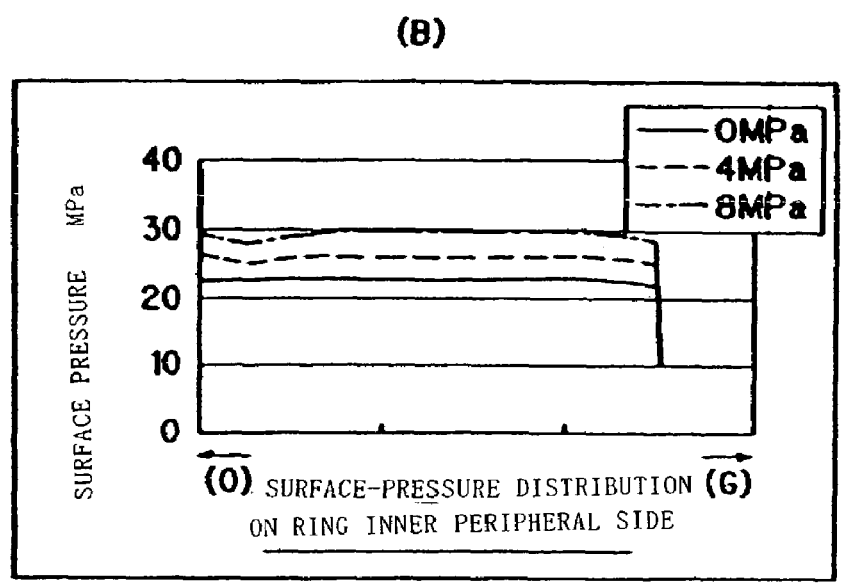
Figure 5:
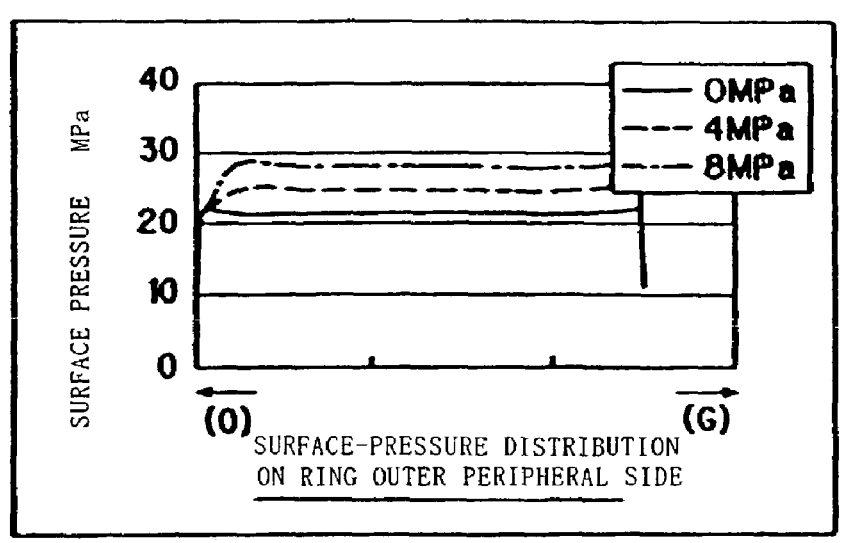

FIG. 1 is a schematic, cross sectional view showing a state, in which the combustion gas seal for injectors, according to the first embodiment of the invention, is attached. FIG. 2 is a schematic, cross sectional view showing a mating structure (a structure of an injector and a cylinder head), on which the combustion gas seal for injectors, according to the embodiment of the invention, is mounted. FIG. 3 is a cross sectional view showing the combustion gas seal for injectors, according to the first embodiment of the invention, with a part thereof broken away. FIG. 4 is a partially enlarged view of FIG. 1. FIG. 5 is a view illustrating a surface-pressure distribution.

A combustion gas seal 1 for injectors, according to the embodiment, serves to seal an annular gap between an injector 50 (outer periphery thereof) and a cylinder head 60 (inner periphery thereof) as shown in FIG. 1, and is used in a state of being attached in a attachment groove 51 provided at a tip end (outer periphery thereof) of the injector 50.

Also, the combustion gas seal 1 for injectors, according to the embodiment, is a ring-shaped member, a material for which is a resin material having a thermal resistance of at least 200° C.

In addition, for example, pure PTFE (polytetrafluoroethylene), a resin composition composed of PTFE and fillers, or a resin material (elastomer or the like) having elasticity is preferable as the material.

And, as shown in FIG. 2, in the case where a groove bottom portion of the attachment groove 51 of the injector 50 being a portion, to which the combustion gas seal 1 for injectors is mounted, has an outer diameter $\phi d$, and the cylinder head 60 has an inner diameter $\phi D$, an inner diameter $\phi d_1$, and an outer diameter $\phi D_1$ of the ring-shaped combustion gas seal 1 for injectors are set to meet $\phi D_1 > \phi D$, $\phi d_1 < \phi d$.

Accordingly, irrespective of presence or absence of pressure caused by the combustion gas, the combustion gas seal 1 for injectors is attached in the attachment groove 51 in a compressed state, and its inner-diameter side and outer-diameter side, respectively, are brought into close contact with the groove bottom portion of the attachment groove 51 of the injector 50 and an inner periphery of the cylinder head 60.

Also, an axial length $h_1$, (see FIG. 3) of the combustion gas seal 1 for injectors is set to be always smaller ($h_1 < h$) than a groove width h of the attachment groove 51 of the injector 50.

More specifically, even in the case of taking account of dimensional tolerances and thermal expansion of respective members, a dimension of $h_1$ is set so that the relationship between a cross sectional area S (see FIG. 2) of a portion defined by the attachment groove 51 of the injector 50 and a cross sectional area $S_1$ (see FIG. 3) of the combustion gas seal 1 for injectors is in the level of $S_1 = 0.9$ S.

Accordingly, the entire of an end surface (referred below to as combustion gas side end surface 1a) on a combustion gas side (G) (bore head side) of the combustion gas seal 1 for injectors is exposed to a combustion gas as shown in FIGS. 1 or 4.

Thereby, the entire of the combustion gas side end surface 1a is acted by pressure of a combustion gas, so that the combustion gas seal 1 for injectors is subjected to an adequate compressive stress to extend toward inner and outer peripheral sides, whereby surface pressures on the groove bottom portion of the attachment groove 51 of the injector 50 and the inner periphery of the cylinder head 60, respectively, are increased.

That is, a self-sealing function is exhibited.

FIG. 5 is views illustrating changes in combustion gas pressure and surface pressure, (A) being a view showing a model when FEM analysis is made, (B) showing results of the FEM analysis illustrating a surface-pressure distribution on the inner peripheral side, and (C) showing results of the FEM analysis illustrating a surface-pressure distribution on the outer peripheral side.

As apparent from the figure, it is seen that the higher pressure of a combustion gas, the higher surface pressure on the inner and outer peripheral sides.

Here, even when a seal (resin ring, or the like) formed from a resin material is compressively attached in an initial stage (stage of design) to possess a sealing performance, its reaction force is generally decreased due to the creep phenomenon with the passage of time.

With the combustion gas seal 1 for injectors, according to the embodiment, however, the self-sealing function is exhibited as described above, so that a stable sealing performance is exhibited over a long term.

As described above, since the combustion gas seal for injectors, according to the embodiment, is formed from a resin material, it produces no noise even when vibrations are transmitted, so that it is possible to improve the sound insulation effect. Also, it is possible to maintain a stable sealing performance over a long term.

(Second Embodiment)

Figure 6:
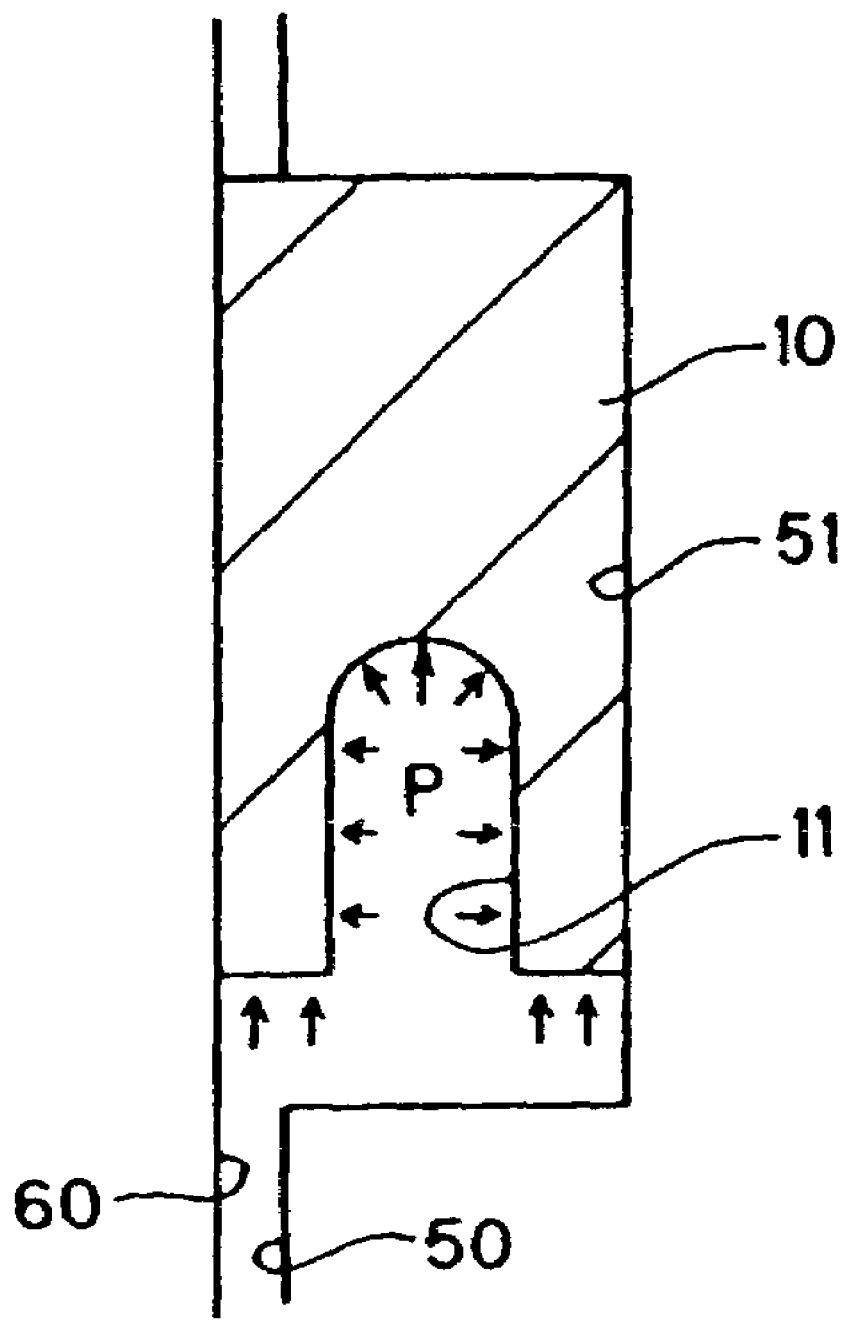
FIG. 6 is a schematic, cross sectional view showing a state, in which a combustion gas seal for injectors, according to a second embodiment of the invention, is attached.

FIG. 6 shows a second embodiment. An explanation will be given to a constitution of the embodiment in the case where a U-shaped groove is provided on the combustion gas side end surface.

Since the other constitution and effect are the same as those in the first embodiment, the same characters denote the same constituents and an explanation therefor is omitted.

FIG. 6 is a schematic, cross sectional view showing a state, in which a combustion gas seal for injectors, according to the second embodiment of the invention, is attached.

In the embodiment, a U-shaped groove 11 opened toward the combustion gas side is provided over an entire periphery of a combustion gas side end surface of a combustion gas seal 10 for injectors.

Thereby, since pressure of a combustion gas acts on wall surfaces of the groove, surface pressures on the groove bottom portion of the attachment groove 51 of the injector 50 and the inner peripheral surface of the cylinder head 60, respectively, can be further increased.

Accordingly, it is possible to achieve further improvement of the sealing performance.

In addition, while the groove having a U-shaped cross section is exemplified in the example as shown, such cross section is not limited to a U-shape but it goes without saying that a similar effect can be produced even when such cross section is shaped otherwise (for example, rectangular, circular, polygonal, or the like).

(Third Embodiment)

Figure 7:
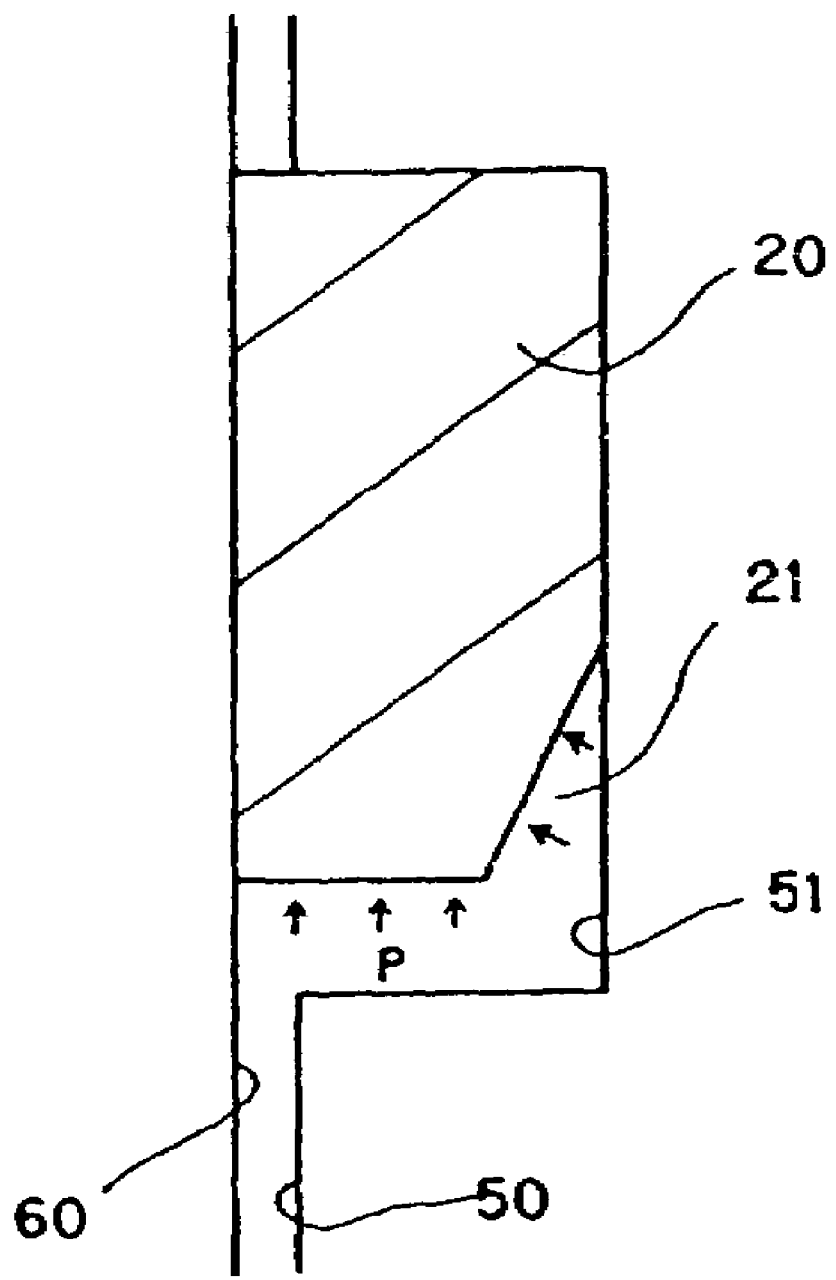
FIG. 7 is a schematic, cross sectional view showing a state, in which a combustion gas seal for injectors, according to a third embodiment of the invention, is attached.

FIG. 7 shows a third embodiment. An explanation will be given to a constitution of the embodiment in the case where a tapered surface is provided on a periphery of an inner-peripheral side end edge of the end surface on the combustion gas side.

Since the other constitution and function are the same as those in the first embodiment, the same characters denote the same constituents and an explanation therefor is omitted.

FIG. 7 is a schematic, cross sectional view showing a state, in which a combustion gas seal for injectors, according to the third embodiment of the invention, is attached.

In the embodiment, a tapered surface 21 is provided on an entire periphery of an inner-peripheral side end edge of the end surface on the combustion gas side of a combustion gas seal 20 for injectors.

Thereby, since pressure of a combustion gas acts on the tapered surface 21, component forces toward an outer peripheral side is generated and a surface pressure on the inner peripheral surface of the cylinder head 60 can be further increased.

That is, a reaction force of the resin ring is decreased due to the creep phenomenon with the passage of time, as described above. Specifically, when used at low temperatures, a gap is liable to be generated on an outer diameter side due to thermal contraction.

In contrast, since the surface pressure on the inner peripheral surface of the cylinder head 60 on the outer peripheral surface side can be increased in the embodiment as described above, a stable sealing performance can be maintained.

In addition, while the same effect is also produced in the second embodiment, formation of the tapered surface on the end in the embodiment is easier in terms of workability than formation of the U-shaped groove as in the second embodiment, and is effective specifically in the case of a gas seal having small dimensions.

(Fourth Embodiment)

FIGS. 10 to 17 shows a fourth embodiment. While the constitution of the third embodiment is shown, in which the tapered surface is provided on an entire periphery of an inner-peripheral side end edge of the end surface on the combustion gas side, an explanation will be given to a constitution of the embodiment, in which a plurality of tapered surfaces are provided at intervals in the circumferential direction of the end edge of the combustion gas side end surface on the inner peripheral side.

Since the other constitution and function are the same as those in the first embodiment, the same characters denote the same constituents and an explanation therefor is omitted.

Figure 8:
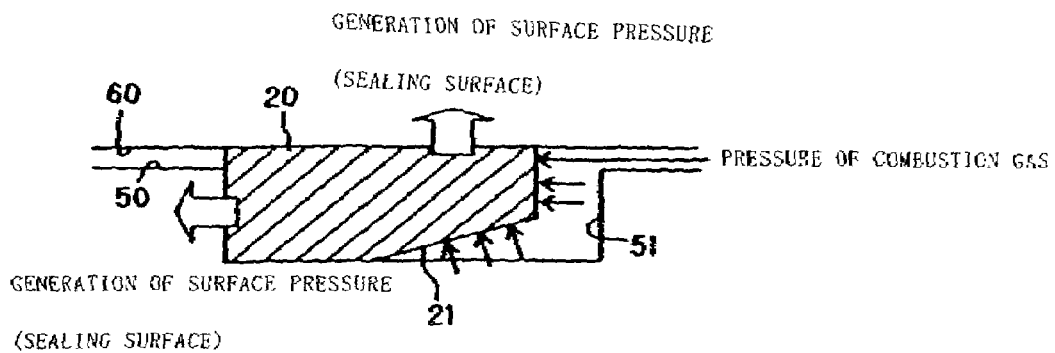
FIG. 8 is a schematic, cross sectional view showing a state, in which the combustion gas seal for injectors, according to the third embodiment of the invention, is used.

In the case where the tapered surface is provided on an entire periphery of an inner-peripheral side end edge of the end surface on the combustion gas side as in the third embodiment, pressure of a combustion gas acts on the combustion gas side end surface and the tapered surface 21 of the combustion gas seal for injectors as shown in FIG. 8, so that surface pressures are generated on a side of the attachment groove 51 of the injector 50 opposed to the combustion gas side and on the inner peripheral surface of the cylinder head 60 to form sealing surfaces.

Figure 9:
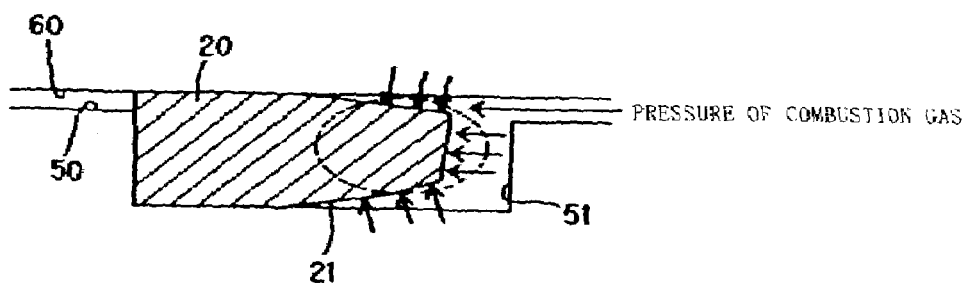
FIG. 9 is a schematic, cross sectional view showing a conceivable malfunction in the combustion gas seal for injectors, according to the third embodiment of the invention.

When the tapered surface is provided over the entire periphery of the end edge of the combustion gas side end surface on the inner peripheral side, however, insufficient rigidity may cause deformation, as shown in FIG. 9, due to deformation at the time of assembly, waviness of a mating surface, waviness of the gas seal itself, or the like.

In the case where such deformation as shown in FIG. 9 is caused, gas pressure acts on a side of an outer peripheral surface, so that gas pressure on the tapered surface and gas pressure on the side of the outer peripheral surface cancel each other, it being conceivable that any adequate surface pressure cannot be generated on the side of the outer peripheral surface, which should form a sealing surface, thus leading to degradation in sealing performance.

Hereupon, the embodiment provides a configuration, in which a tapered surface is not provided over the entire periphery but a plurality of tapered surfaces is provided at intervals.

Figure 10:
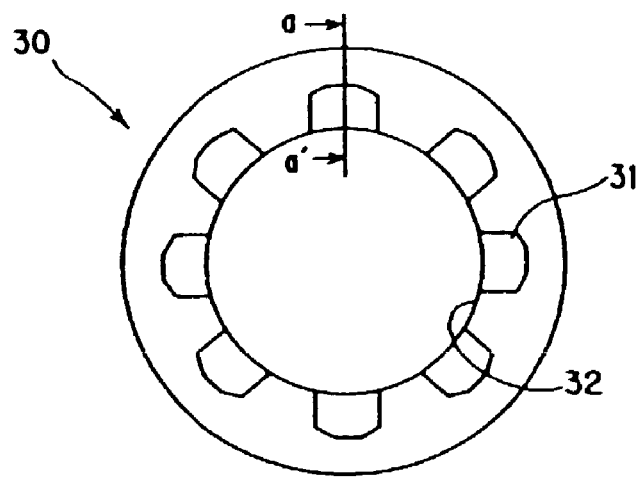
FIG. 10 is a bottom view showing a combustion gas seal for injectors, according to a fourth embodiment of the invention.
Figure 11:
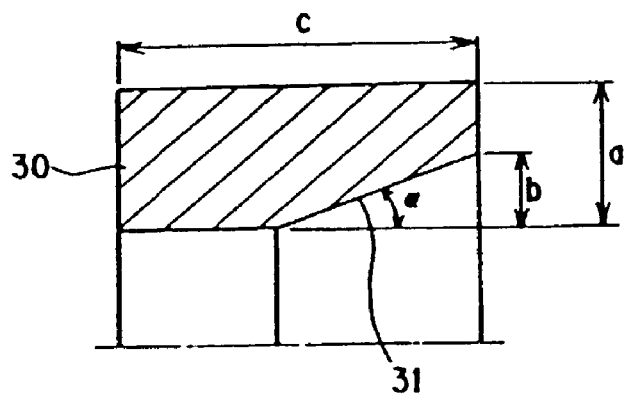
FIG. 11 is a cross sectional view taken along the line aa' in FIG. 10.
Figure 12:
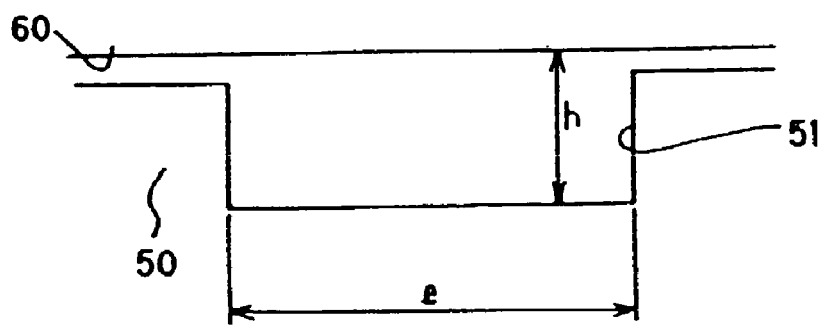
FIG. 12 is a schematic, cross sectional view showing a mating structure, to which the combustion gas seal for injectors, according to the embodiments of the invention is mounted.
Figure 13:
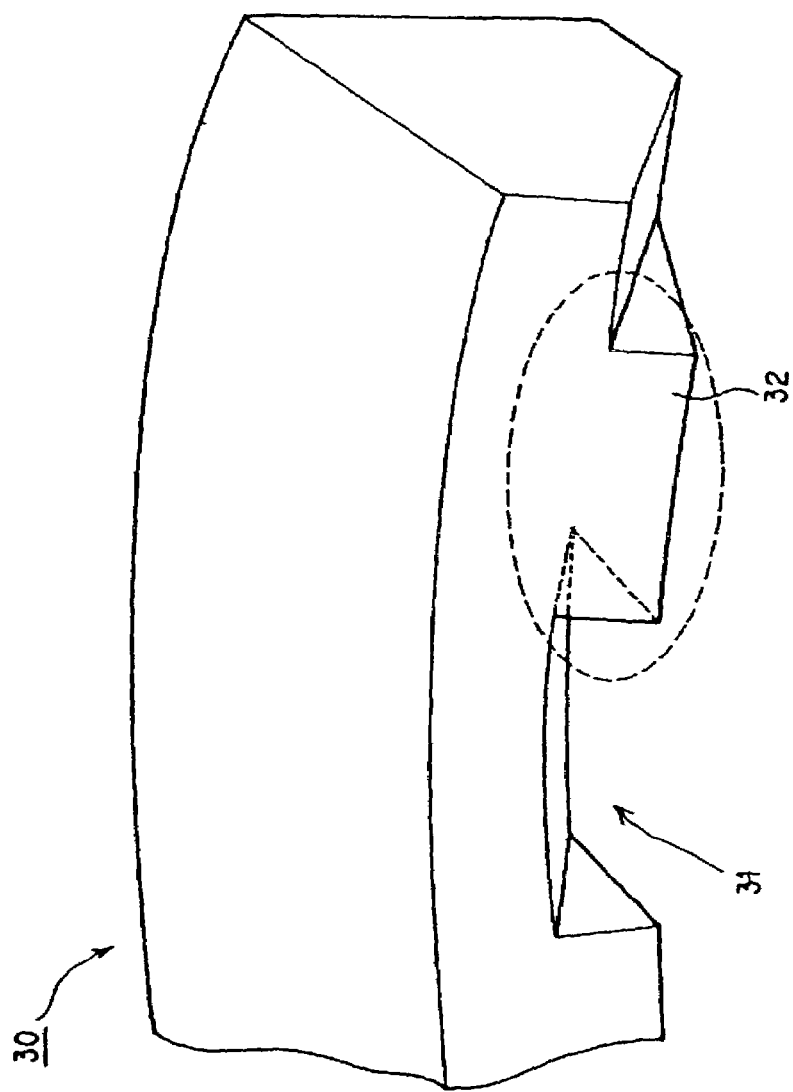
FIG. 13 is a fragmentary, perspective view showing the combustion gas seal for injectors, according to the fourth embodiment of the invention.

FIG. 10 is a bottom view showing a combustion gas seal for injectors, according to a fourth embodiment of the invention. FIG. 11 is a cross sectional view taken along the line aa' in FIG. 10. FIG. 12 is a schematic, cross sectional view showing a mating structure (a construction of an injector and a cylinder head), to which the combustion gas seal for injectors, according to the embodiment of the invention, is mounted. FIG. 13 is a fragmentary, perspective view showing the combustion gas seal for injectors, according to the fourth embodiment of the invention.

Figure 14:
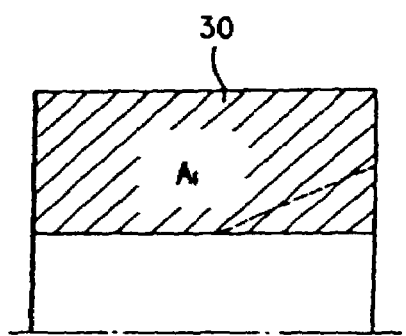
FIG. 14 is a schematic, cross sectional view showing the combustion gas seal for injectors, according to the fourth embodiment of the invention.
Figure 15:
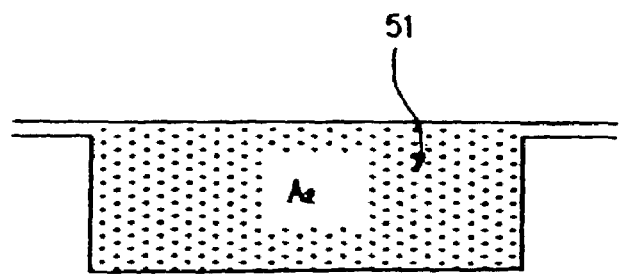
FIG. 15 is a schematic, cross sectional view showing a mount portion.

Also, FIGS. 14 and 15 are views illustrating the area relationships among respective portions in a attach portion, FIG. 14 being a schematic, cross sectional view showing the combustion gas seal for injectors, according to the fourth embodiment of the invention, and FIG. 15 being a schematic, cross sectional view showing the mount portion.

Figure 16:
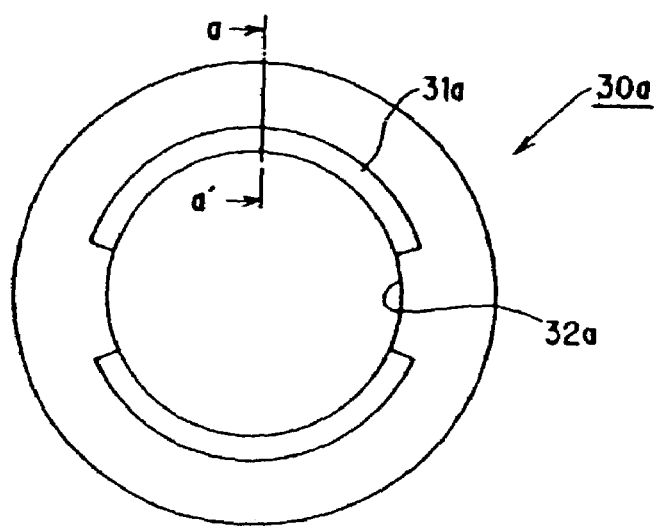
FIG. 16 is a bottom view showing an example of a modified configuration of the combustion gas seal for injectors, according to the fourth embodiment of the invention.
Figure 17:
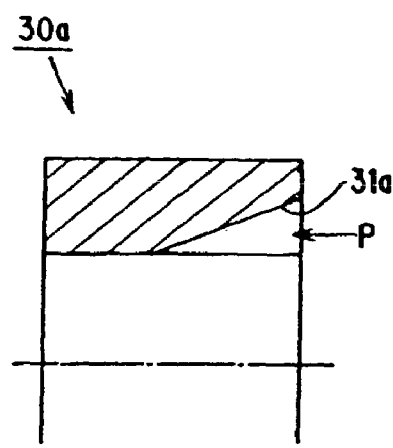
FIG. 17 is a cross sectional view taken along the line aa' in FIG. 16.
Figure 18:
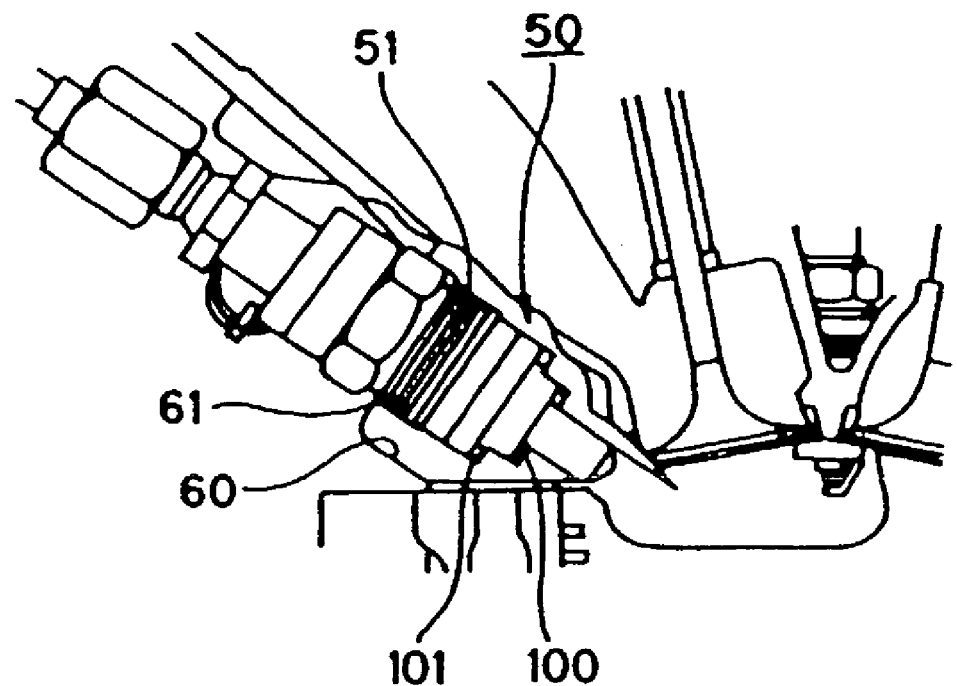
FIG. 18 is a schematic view showing a configuration, in which an injector is mounted on a cylinder head of an engine.
Figure 19:
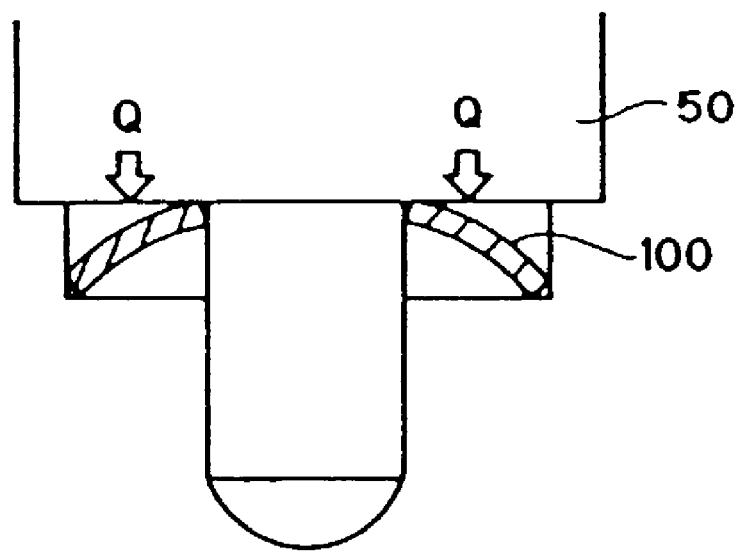
FIG. 19 is a view illustrating a combustion gas seal for injectors, according to the conventional art.

Also, FIG. 16 shows an example of a modified configuration of the combustion gas seal for injectors, according to the embodiment, and FIG. 17 is a cross sectional view taken along the line aa' in FIG. 16.

As shown in FIG. 10 or FIG. 13, the combustion gas seal 30 for injectors, according to the embodiment, is provided with a plurality of tapered surfaces 31 at intervals in the circumferential direction of an end edge of a combustion gas side end surface on an inner peripheral side. In addition, the tapered surfaces 31 are placed at equal intervals in eight locations in the example shown in FIG. 10.

There may be adopted a configuration in which those portions, on which the tapered surfaces 31 are not provided, serve as stoppers 32.

That is, not only the provision of those portions, on which the tapered surfaces 31 are not provided, increases rigidity but also the portions abut against the groove bottom surface of the attachment groove 51 of the injector 50 to function as the stoppers 32 for prevention of deformation toward the inner peripheral side.

As described above, deformation as shown in FIG. 9 can be prevented by providing the plurality of tapered surfaces 31 at intervals in the circumferential direction of the end edge of the combustion gas side end surface on the inner peripheral side and causing those portions, on which the tapered surfaces 31 are not provided, to function as the stoppers 32.

Thereby, a more stable sealing performance can be maintained by preventing abnormal deformation in addition to the effect produced in the above third embodiment.

Subsequently, an explanation will be given to dimensions of respective parts, or the like, referring to FIGS. 11 and 12.

As shown in FIG. 11, $\alpha$ denotes a taper angle of the tapered surfaces 31, b denotes a depth of grooves formed by the tapered surfaces 31, a denotes a thickness of the combustion gas seal 30 for injectors, and c denotes a width of the combustion gas seal 30 for injectors.

Also, as shown in FIG. 12, e denotes a groove width of the attachment groove 51 of the injector 50, and h denotes a distance from the groove bottom of the attachment groove 51 of the injector 50 to the inner peripheral surface of the cylinder head 60.

In this case, the taper angle $\alpha$ is 0 to 90°, preferably 5 to 45°, and more preferably 5 to 25°.

Also, the thickness a of the combustion gas seal 30 for injectors meets a>h, and preferably a≧(h+0.05) mm.

Also, the depth b of the grooves suffices to meet a>b.

Also, the width c of the combustion gas seal 30 for injectors meets e>c, and preferably e×0.9>c.

Subsequently, an explanation will be given to a filling rate referring to FIGS. 14 and 15.

With the combustion gas seal for injectors, according to the embodiment of the invention, the filling rate for the attach portion is set to be at most 100%.

That is, where A1 denotes an area (a cross sectional area in a state, in which compression or the like is not effected prior to attaching) of a cross section (a cross section of those portions, on which the tapered surfaces are not provided) of the combustion gas seal for injectors, as shown in FIG. 14, and A2 denotes an area of a cross section of annular gap portion defined by the attachment groove 51 of the injector 50 and the inner peripheral surface of the cylinder head 60, as shown in FIG. 15, A1÷A2≦1 is set to be established.

Subsequently, an explanation will be given to an example of a modified configuration referring to FIGS. 16 and 17.

While the provision of a multiplicity (eight) of tapered surfaces is shown in the example of FIG. 10, what is essential is that abnormal deformation is not caused taking account of materials for the seal, conditions of use, or the like.

Accordingly, there may be adopted a configuration, in which tapered surfaces 31a are formed only in two locations and stoppers 32a are also formed only in two locations as in a combustion gas seal 30a for injectors, shown in FIGS. 16 and 17.

INDUSTRIAL APPLICABILITY

As described above, since the combustion gas seal for injectors, according to the invention, is formed from a resin, it is possible to prevent generation of noise to achieve an improvement in sound insulation effect. Also, since the combustion gas seal for injectors, according to the invention, is subjected to pressure of a combustion gas to enable increasing surface pressures on mating members (an injector and a cylinder head), a stable sealing performance is exhibited over a long term to improve a sealing performance.

When the combustion gas seal for injectors, according to the invention, is formed from a resin material having a thermal resistance of 200° C., deterioration can be prevented even in use at high temperatures.

When a groove opened toward a combustion gas side is provided over an entire periphery of a combustion gas side end surface of the combustion gas seal for injectors, according to the invention, the sealing performance can be further improved.

The sealing performance can be further improved also by providing a tapered surface over an entire periphery of an inner-peripheral side end edge of a combustion gas side end surface of the combustion gas seal for injectors, according to the invention.

When a plurality of tapered surfaces are provided at intervals in the circumferential direction of an inner-peripheral side end edge of a combustion gas side end surface of the combustion gas seal for injectors, according to the invention, the sealing performance can be further improved and stabilized since abnormal deformation can be prevented.

What is claimed is:

1. A combustion gas seal for injectors, having a cylindrical shape, formed from a resin and attached in an attachment groove provided in an injector, which is to be mounted on a cylinder head of an engine, to seal an annular gap between the cylinder head and the injector, characterized in that an inner diameter prior to compressive deformation is set to be smaller than an outer diameter of the attachment groove and an outer diameter prior to compressive deformation is set to be larger than an inner diameter of a seal abutment of the cylinder head, that an entire end surface on a combustion gas side is arranged to be exposed to a combustion gas, and that a plurality of tapered surfaces are provided at intervals in the circumferential direction of only an inner peripheral side end edge of the end surface on the combustion gas side.

2. The combustion gas seal for injectors, according to claim 1, wherein inner peripheral surfaces of those portions, on which the tapered surfaces are not provided, abut against a groove bottom surface of the attachment groove.

3. The combustion gas seal for injectors, according to claim 1, wherein the seal is formed from a resin material having a thermal resistance of at least 200 degree ° C.

4. A combustion gas seal for injectors, having a cylindrical shape, formed from a resin and attached in an attachment groove provided in an injector, which is to be mounted on a cylinder head of an engine, to seal an annular gap between the cylinder head and the injector, characterized in that an inner diameter prior to compressive deformation is set to be smaller than an outer diameter of the attachment groove and an outer diameter prior to compressive deformation is set to be larger than an inner diameter of a seal abutment of the cylinder head, that an entire end surface on a combustion gas side is arranged to be exposed to a combustion gas, that a tapered surface is provided on an entire periphery of only an inner peripheral side end edge of the end surface on the combustion gas side, and that the seal is formed from a resin material having a thermal resistance of at least 200° C.

* * * * *